July 3, 1956 — E. H. WEBER — 2,753,141
BRACKET FOR SUPPORTING OUTLET BOX
Filed Nov. 10, 1951
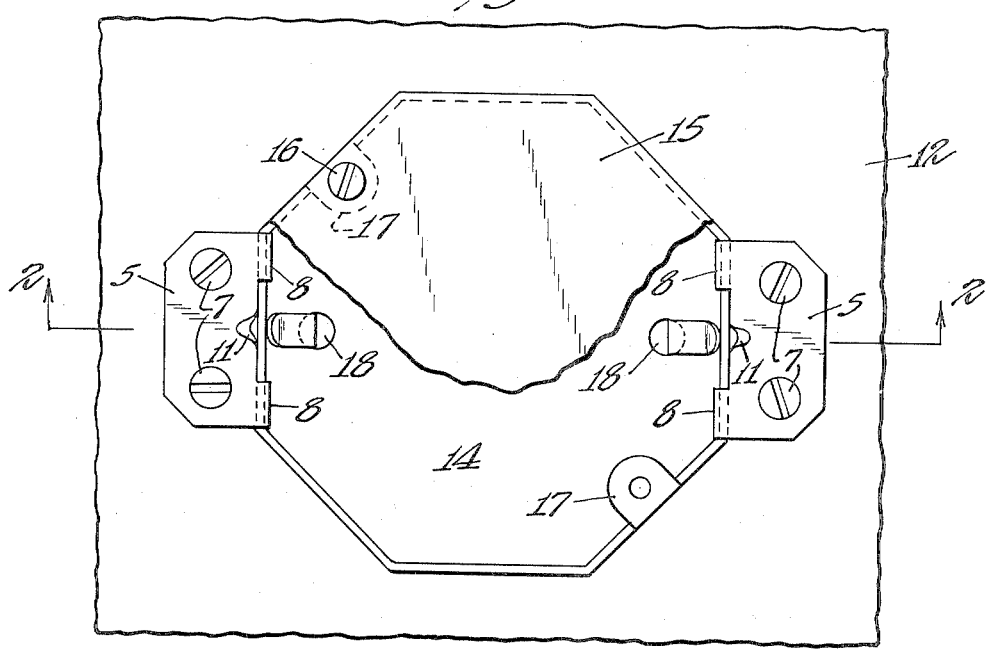
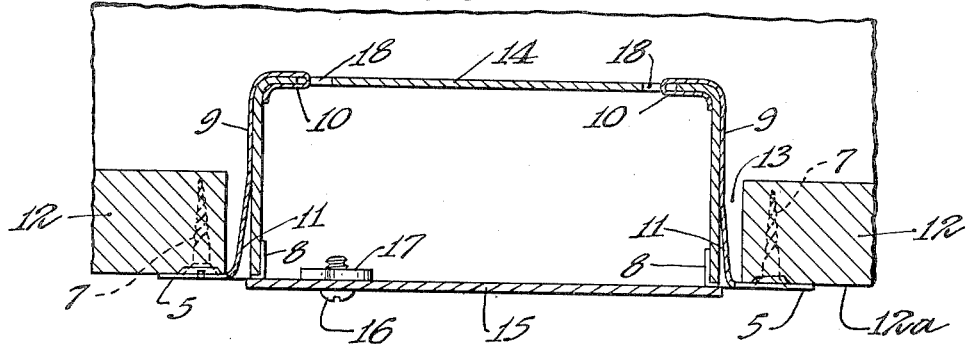
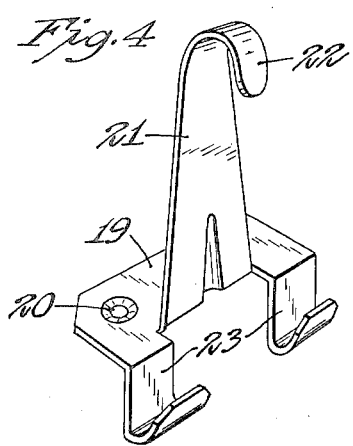
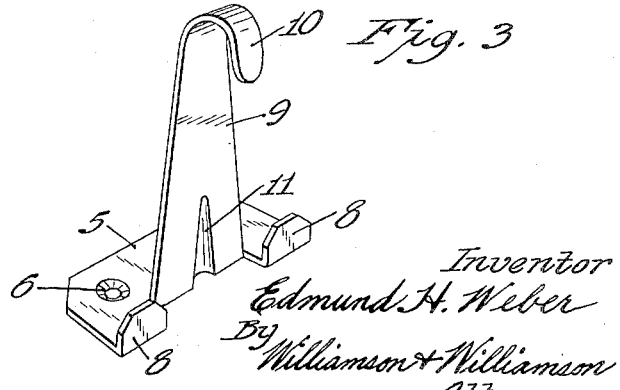
Inventor
Edmund H. Weber
By Williamson & Williamson
Attorneys

United States Patent Office 2,753,141
Patented July 3, 1956

2,753,141

BRACKET FOR SUPPORTING OUTLET BOX

Edmund H. Weber, International Falls, Minn.

Application November 10, 1951, Serial No. 255,821

1 Claim. (Cl. 248—27)

This invention relates to brackets for mounting such boxes as outlet boxes, switch boxes, etc., in wall openings.

It is the general object of the invention to provide a novel and improved bracket of cheap and simple construction for this purpose which can be applied to such a box as an electrical outlet box, and will permit the outlet box to be inserted from one side of a wall into a wall opening and will mount the box in such wall opening.

The objects and advantages of the invention will more fully appear from the following description made in connection with the accompanying drawings wherein like reference characters refer to the same or similar parts through the various views and in which;

Fig. 1 is a view in front elevation showing an electrical outlet box installed in a wall opening by use of the brackets of the invention.

Fig. 2 is a horizontal section taken on the line 2—2 of Fig. 1.

Fig. 3 is a perspective view of one of the brackets of the invention shown as it will appear ready for use before being applied to a box; and Fig. 4 is a perspective view of a slightly modified form of bracket.

Referring first to the form of the invention shown in Figs. 1, 2 and 3, there is provided a bracket for securing such a box as an electrical outlet box to a wall opening. As the bracket is constructed and marketed ready for use, the bracket appears as shown in Fig. 3. Two of the brackets applied to mount the conduit box are shown in Figs. 1 and 2. The bracket includes a base 5 of substantially rectangular shape and this base is preferably equipped with screw apertures 6 and in the form shown the material around these apertures is pressed inwardly so that the heads of wood screws such as the screws 7 may be countersunk in the base 5 to allow the heads of the screws to lie flush with the external surface of the base 5. At one side of the base 5, adjacent the ends thereof, angular projecting tabs are formed which form hooks 8, these hooks of course joining the base 5 and being formed from the same sheet of metal as is the base. Also joining the same side of the base 5 but spaced inwardly somewhat from the hooks 8 is an arm 9, which extends generally normal to the base and this arm is tapered towards its outer end so as to reduce the width of the same near its outer end to thereby make the end portion of the arm more pliable than the remainder of the same. The outer end of the arm 9 is reversely curved as the bracket is formed to form a tongue 10 and this tongue being formed of sheet metal of comparatively narrow width is distortably bendable. To give greater strength to the portion of the arm 9 joining the base 5 a crimp 11 is formed in this section of the arm so that such portion of the arm cannot be readily bent.

In Figs. 1 and 2 there is shown a wall 12 having an opening 13 cut therein from the side 12a of the wall for reception of an ordinary electrical conduit box 14. This conduit box is normally equipped with a cover 15 which may be secured to the box to close the same by means of machine screws 16 screwed into tapped inturned lugs 17, formed adjacent the outer portion of the side walls of the box 14. Also the box 14 is as customarily provided with a plurality of openings 18 in its back wall.

Two of the brackets of the invention will be employed for mounting a box such as the box 14 and these two brackets will be applied at opposite sides of the box. In applying one of the brackets to the box the base 5 will be disposed laterally of the box and the hooks 8 will be engaged over the inner side wall of the box as best shown in Fig. 2, thereby bringing the major portion of the arm 9 into direct contact with the outer surface of the wall of the box. The tongue 10 which, as stated, is bendable will then be inserted through the opening 18 and will be carried around against the inner surface of the bottom portion of the box and tightly brought into engagement with the surface so as to crimp the tongue against two opposite surfaces of the box. Of course, when the brackets are applied to the box the cover 15 will have been removed. After the two brackets have been applied as directed the box with the brackets attached will be inserted in the wall opening so that the bases 5 of the two brackets bear against the surface 12a of the wall 12. The brackets may then be attached to the wall 12 by the use of wood screws 7 running through the screw openings 6. The cover 15 may then be secured to the box by the screws 16 after the proper wiring has been run into the box.

In Fig. 4 a slightly different form of the bracket is shown, this bracket including a base 19, corresponding to the base 5 and having screw openings 20, and an arm 21 provided with a bendable tongue 22. The bracket shown in Fig. 4 is also provided with hooks 23, but these hooks are first bent outwardly from the base 19 in a direction opposite the arm 21, and then the hooks are provided with reversely curved lips. The hooks 23 are of bendable material and as they are applied to a box such as an outlet box, the outermost portions of the hooks will be crimped inwardly against the inner surface of the side walls of the box, and therefore it is possible to mount the outlet box so that it projects outwardly a short distance beyond the surface of the wall to which the outlet box is attached. Another way of using the bracket shown in Fig. 4 is to first hook the tongue 22 within the opening 18 of the outlet box and thereafter swing up the hooks 23 into engagement with the inner surface of the side wall of the box about an axis taken through the side edge of the base 19 at points where the hooks 23 join the side edge. When this latter method of installation is employed and the tongue 22 is crimped against the bottom portion of the box the bracket shown in Fig. 4, when applied to the box, will have the same appearance as the bracket shown in Fig. 2. In some respects the bracket shown in Fig. 4 is easier to apply to the box than the bracket shown in Fig. 3, as no difficulty will be experienced in the case of the use of the bracket shown in Fig. 4 in inserting the tongue 22 within the box opening 18.

In some instances it may be desirable to eliminate the screw openings 6 or 20 and provide other means for attaching the brackets to the wall.

While the brackets of the invention are intended primarily for use in mounting electrical outlet boxes in a wall opening by application from one side of the wall only, they are equally useful for securing switch boxes and other types of boxes and devices in wall openings.

It will be seen that highly efficient brackets have been provided for the purposes intended.

It will of course be understood that various changes may be made in the form, details, arrangement and proportion of the various parts without departing from the scope of the present invention which generally stated, consists in the matter shown, and described, and set forth in the appended claim.

What is claimed is:

A supporting bracket for mounting a standard octagonal electric box in an opening in a wall comprising a generally rectangular wall-engaging base having adjacent its two ends and at one side thereof angular tabs forming hooks, an elongated and tapered arm joined to the same side of the wall-engaging base in inwardly spaced relation from the said hooks, said arm being reversely bendable at its outer end for insertion through an opening at the rear of said electric box, and said hooks being offset from the base in opposite relation to said arm whereby to hold said electric box in forwardly jutting relation with respect to the surface of said wall.

References Cited in the file of this patent

UNITED STATES PATENTS

| | | |
|---|---|---|
| 796,468 | Streeter | Aug. 8, 1905 |
| 1,509,288 | Fralick | Sept. 23, 1924 |
| 1,818,814 | Riggs | Aug. 11, 1931 |
| 1,896,898 | Hildebrand | Feb. 7, 1933 |
| 2,299,676 | Austin | Oct. 20, 1942 |
| 2,346,402 | Snyder | Apr. 11, 1944 |
| 2,374,622 | Rugg | Apr. 22, 1945 |
| 2,429,443 | Yeschick | Oct. 21, 1947 |
| 2,480,805 | Buckels | Aug. 30, 1949 |
| 2,635,778 | Dieffenderfer | Apr. 21, 1953 |